United States Patent [19]

Katz

[11] 3,912,875

[45] Oct. 14, 1975

[54] RADIO-TELEPHONE COMMUNICATION SYSTEM

[76] Inventor: Paul Katz, 8902 Bridgehaven Court, Alexandria, Va. 22308

[22] Filed: Apr. 3, 1972

[21] Appl. No.: 402,638

[52] U.S. Cl. .......... 179/41 A
[51] Int. Cl.² .......... H04M 5/08
[58] Field of Search .......... 179/41 A, 2 A, 2 B; 325/55, 37, 392, 64

[56] References Cited

UNITED STATES PATENTS

| | | | |
|---|---|---|---|
| 3,193,623 | 7/1965 | Burns et al. | 179/41 A |
| 3,351,714 | 11/1967 | Kunzelman et al. | 179/41 A |
| 3,443,035 | 5/1969 | McCay | 179/41 A |
| 3,644,681 | 2/1972 | Rice | 179/41 A |
| 3,721,771 | 3/1973 | Greneker | 179/41 A |

*Primary Examiner*—Kathleen H. Claffy
*Assistant Examiner*—Gerald L. Brigance
*Attorney, Agent, or Firm*—Wegner, Stellman, McCord, Wiles & Wood

[57] ABSTRACT

A remote telephone communication system having a base station connected with a telephone switching system for automatically establishing a radio communication link between a remote station and selected telephones of the telephone switching system. The base station automatically connects its radio transmitter and receiver with the telephone switching system in response to reception of an initiate signal from the remote station or reception of a ring signal from the telephone switching system, simulates dialing to the telephone switching system in response to dial pulses transmitted by the remote station and terminates the call connection in response to reception of a second occurrence of the initiate signal. The remote radio station is provided with means for generating an initiate signal and dial signal pulse so that a remote operator may place a call directly to a preselected telephone. Signals received at the remote station from a calling telephone are utilized to provide an indication of an incoming call and to inhibit generation of the initiate signal upon answering the call.

6 Claims, 5 Drawing Figures

RADIO-TELEPHONE COMMUNICATION SYSTEM

BACKGROUND OF THE INVENTION

1. Field of the Invention

This invention relates generally to communication systems and, more particularly, to a remote radio-telephone communication system capable of automatically establishing radio communication between remote stations and telephones of a telephone switching system connected with a base station.

2. Description of the Prior Art

Remote radio-telephone communication systems have been proposed which enable an operator at a remote radio station to automatically place calls to, and receive calls from, selected telephones of a telephone switching system through a base radio station connected with the telephone system. Invariably, however, in an attempt to simulate telephone use and operation at the remote station, all known systems have been made unduly complex and expensive beyond the practical needs of a remote telephone communication system. For example, one known system requires transmission of a first tone to the remote station to provide an indication of an incoming call, transmission of a second tone to the base station to answer the call, transmission of a third tone to the base station to remotely dial a selected telephone number, and transmission of a fourth tone to the base station to terminate the call connection.

Further, because of the relatively complex signalling of these past systems, it has been impractical to adapt the many remote radio transceivers currently used as remote stations by owners of nonautomatic systems for use in these newer automatic remote dialing systems. Thus, this otherwise useful equipment, upon changing to an automatic system, has been rendered obsolete, or because of the additional expense incurred because of the inability to use this old equipment, operators have chosen to continue using the less suitable nonautomatic systems which require an operator at the base station to make the necessary call connections.

SUMMARY OF THE INVENTION

It is a principal object of the present invention to provide a radio-telephone communication system which is less complex but as reliable or more reliable than prior systems.

Thus, in accordance with the radio-telephone communication system of this invention, a base station connected with a telephone switching system automatically answers an incoming call upon reception of a ring signal from the telephone switching system and transmits the signals from the calling telephone to the remote station, rather than transmitting a separate incoming call signal to the remote station and waiting for reception of an answer signal from the remote signal before answering the call. Reception of the signals from the telephone energizes an incoming call indicator at the base station until the call is answered, at which time communication may immediately commence.

In placing a call from the remote station, an initiate signal is automatically transmitted to the base station upon removal of a remote station handset from its cradle position. The base station, upon reception of the initiate signal, makes the requisite connections with the switching system for placing a call and establishing communication with the remote station. After the connection with the switching system has been made, the base station may simulate to the system in accordance with dial signal pulses transmitted by the remote station, the local dialing of a telephone number to place a call to a selected telephone. The call connection is broken by the base station upon reception of a second occurrence of the initiate signal. This eliminates the need for additional signal generators and detectors called for by the separate terminate and initiate signals used in prior systems.

Further, because of the simplification of the remote radio-telephone communication system of this invention, a remote dial unit capable of generating the requisite initiate signal and dial signal pulses may be provided as a separate unit to be attached to a standard radio transceiver to adapt it for use as the remote station.

BRIEF DESCRIPTION OF THE DRAWINGS

These and other features and advantages of this invention will be made apparent from the following detailed description taken in conjunction with the following drawings, in which.

DESCRIPTION OF THE PREFERRED EMBODIMENT

I. THE SYSTEM GENERALLY

Figure 1:
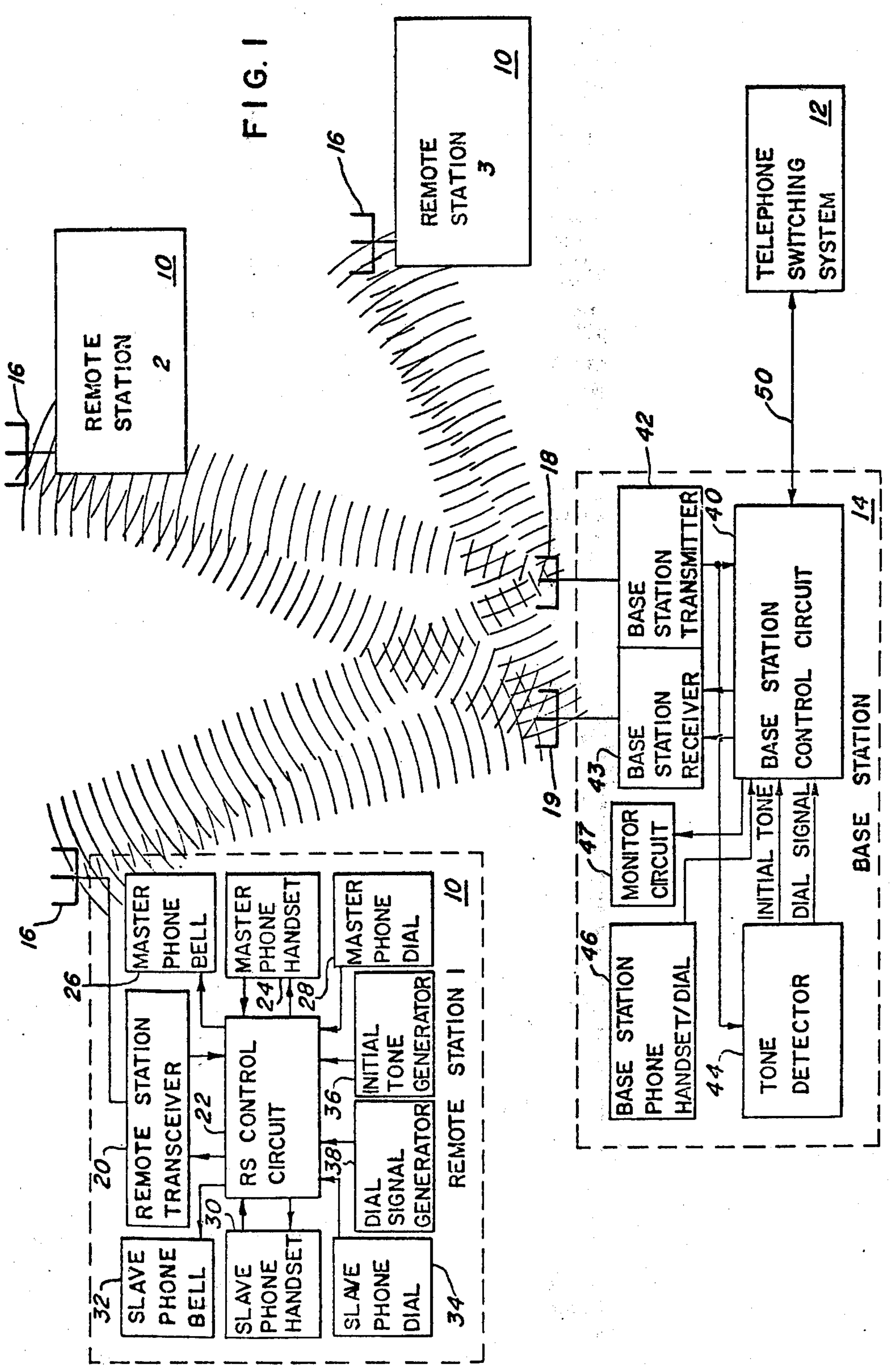
FIG. 1 is a block diagram of a preferred embodiment of the remote telephone communication system including a base station and a plurality of remote stations for operation in conjunction with a telephone switching system.

Turning now to FIG. 1, a block diagram of a preferred embodiment of the remote telephone communication system of the invention is shown in which a radio communication link may be established between a plurality of remote stations 10 and telephones of a telephone switching system 12 through a base station 14. Each remote station 10 has an antenna 16 for transmitting radio waves to a receiving antenna 19 of base station 14, and for receiving radio waves from a transmitting antenna 18 of base station 14. Antenna 16, in turn, is connected with a remote station transceiver 20 which, under the control of a remote station control circuit 22, may be operated in either a transmitting mode or a receiving mode. The remote station control circuit 22 is also connected with a master telephone handset 24 and an associated master telephone bell 26 for providing an indication of an incoming call, and a master telephone dial 28 for enabling an operator to make a communication connection with a selected telephone of telephone switching system 12. An extension telephone or slave telephone handset 30 may also be provided with an associated slave telephone bell 32 and a slave telephone dial 34. Finally, the remote station control circuit 22 is connected with an initiate signal generator 36 and a dial signal generator 38, the functions of which will be discussed below.

The base station 14 is provided to complete the radio communication link between the remote stations 10 and selected telephones of telephone switching system 12. The base station control circuit 40 is connected with telephone switching system 12, a base station transmitter 42, a base station receiver 43, a tone discriminator 44, and a base station telephone handset 46, and performs the necessary switching functions in response to signals from both telephone switching system 12 and remote stations 10 to establish the desired communication link.

When an incoming call from a telephone of telephone switching system 12 is received, a ring indicator signal is placed on the telephone line 50 by switching system 12, and base station control circuit 40, in response thereto, keys on base station transmitter 42 to transmit carrier waves to all of remote stations 10. The transmitted carrier is received by remote station transceiver 20, which is normally in a receive mode, and coupled to the remote station control circuit 22 which actuates both the master telephone bell 26 and the slave telephone bell 32 in response thereto. It is contemplated that if an operator is present at the called remote station, he will lift one of the handsets from its cradle position to speak to the calling party. The remote station control system 22 in response to either telephone handset being lifted from its cradle deenergizes both telephone bells. An operator at remote station 10 may then manually actuate a push-to-talk button (not shown) to put remote station transceiver 20 into its transmit mode and answer the call with a customary greeting spoken into the handset microphone (not shown). The handset microphone is connected to the input of remote station transceiver 20 through remote station control circuit 22 and is transmitted back to the base station on a suitably modulated carrier wave where it is received, demodulated and coupled back to the calling telephone through base station control circuit 40 and telephone switching system 12. The direction of communication is controlled by operation of the push-to-talk button at the remote station. The call connection will be broken by telephone switching system 12 when the calling party hangs up his telephone or terminated by base station control circuit 40 in response to reception of an initiate signal from the remote station which is automatically transmitted when both remote station handsets are returned to the cradle position.

To initiate a call from the remote station to a selected telephone of telephone switching system 12, the operator at the remote station first lifts one of the telephone handsets off its cradle which, by operation of control circuit 22, automatically puts remote station transceiver 20 into the transmit mode and couples the output of initiate signal generator 36 to transceiver 20 for transmission thereby to base station 14. The base station control circuit 40, upon reception of a preselected number of initiate signal pulses, connects base station 14 with telephone switching system 12. It is contemplated that telephone switching system 12 in response to being connected with base station 14 will generate a dial tone on telephone line 50 which will be coupled through base station control circuit 40 to base station transmitter 42 to be transmitted thereby to remote station 10. the operator at the remote station upon hearing the dial tone may then dial the typical 7 or 10 digit telephone number corresponding to the selected telephone to be called on one of the telephone dials 28 or 34. When a number is dialed, the remote station control circuit couples a corresponding number of dial signal pulses from the dial signal generator to remote station transceiver 20 for transmission thereby to base station 14. It is contemplated that telephone switching system 12 will then make the appropriate connections to the selected telephone. Once communication is established by the called party answering his telephone, the direction of communication is controlled by the operator of the remote station through actuation of the push-to-talk button.

The call may be terminated by either the called party hanging up his telephone or by the operator at the remote station returning his handset to its cradle. If the handset at the remote station is returned to its cradle, the control circuit 22 in response thereto transmits an initiate signal to base station 14 which disconnects telephone switching system 12 in response thereto.

A tepehone handset 46 and telephone dial is provided at base station 14 to locally connect the base station with a telephone of telephone switching system 12 or, to communicate with remote station 10. A monitor circuit 47 is also provided to enable an operator at the base station to monitor communication between a telephone of telephone switching system 12 and a remote station 10.

II. BASE STATION OPERATION

A. AUTOMATIC BASE STATION OPERATION DURING INCOMING CALL TO REMOTE STATION

Figure 2:
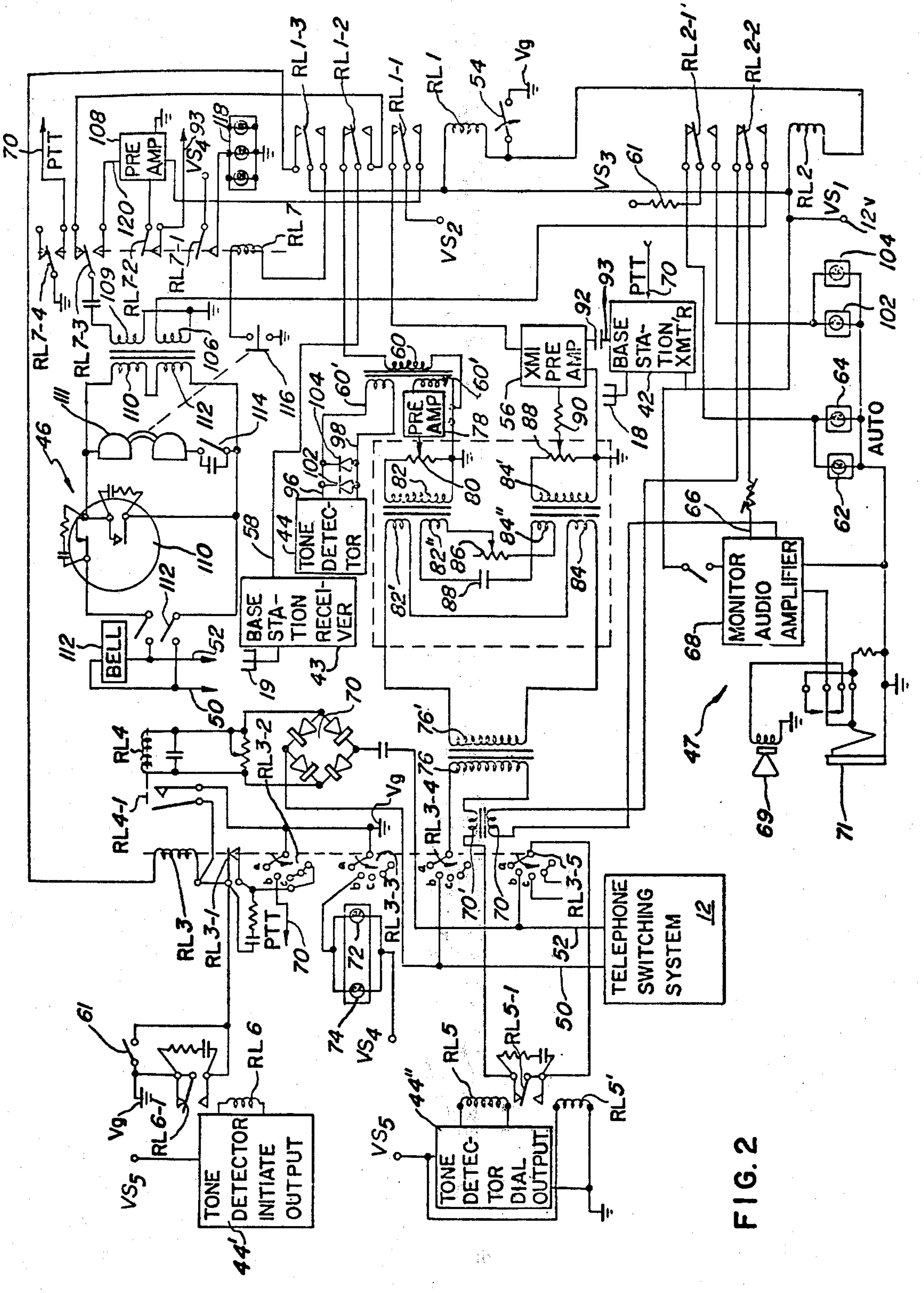
FIG. 2 is a schematic circuit diagram of a preferred embodiment of the base station with the receiver, transmitter and tone detector of FIG. 1 shown in block form.

Referring now to FIG. 2, a schematic diagram of a preferred embodiment of a base station suitable for use in the remote telephone communication system of FIG. 1 is shown. Base station 14 is connectable with telephone switching system 12 by a pair of telephone wires 50 and 52 over which a communication link may be established by switching system 12 between base station 14 and a calling telephone when the telephone number at the base station is dialed at the calling telephone. Provided at base station 14 is a mode selection switch 54, which when in its automatic or open position, as shown in FIG. 2, conditions base station control circuit 40 to automatically answer incoming calls and to establish a communication link between the calling party and the remote stations. Mode selection switch 54 has one side coupled to a reference potential $V_g$, such as ground, and the other side coupled to one common side of two parallel relays RL1 and RL2, which, in turn, have their other common side coupled to a first voltage source $V_{s1}$. With remote selection switch 54 in its automatic or open position, relays RL1 and RL2 are in an unenergized state and their respective relay contacts RL1-1, RL1-2 and RL1-3, and RL2-1 and RL2-2, are in their respective unenergized positions, as shown in FIG. 2, to condition base station 14 to operate in its automatic mode.

The contacts of relay RL1 enable an automatic answering circuit and establish the necessary connections between base station receiver 43 and transmitter 42 for communication between the calling telephone and remote stations 10. Relay contact RL1-1 connects a second voltage source $V_{s2}$ with a transmitter preamplifier 56 to enable it to amplify incoming audio signals from a calling telephone and apply the amplified signals to base station transmitter 42 for transmission thereof through transmitting antenna 18 to remote stations 10. Relay contact RL1-2 couples the received signals from remote station 10 on output 58 of base station receiver 43 to a transformer coil 60 to ultimately transmit it via telephone wires 50 and 52 and telephone switching system 12 to the calling telephone. Relay contact RL1-3 couples supply voltage $V_{s1}$ to one side of a third relay coil RL3 to enable subsequent energization thereof upon reception of an incoming call.

The relay contacts of relay RL2 activate an automatic mode indicator at base station 14 and enable a monitor circuit 47. Relay contact RL2-1 couples a third voltage source $V_{s3}$ through a resistor 61 to one side of parallel lamps 62 and 64 which light to provide a visual indication that the base station is in the automatic mode. Relay contact RL2-2 couples an input 66 of a monitor audio amplifier 68 to a monitor relay coil 70 so that an operator at the base station may monitor, over a speaker 69, the communication between a telephone and a remote station 10. A telephone jack receptacle 71 may also be provided to allow monitoring over an auxiliary speaker such as a headset speaker or the like.

When a calling party dials the telephone number of base station 14, telephone switching system 12, upon making a connection therewith, establishes a ringing signal across telephone lines 50 and 52. This ringing signal is coupled across a full wave rectifier circuit 70 which develops a DC voltage across a fourth relay coil RL4 which is energized thereby. Upon the energization of relay coil RL4, relay contact RL4-1 closes to complete a circuit through relay RL3 from voltage source $V_{s1}$ to ground reference potential $V_g$. when this circuit is completed, relay RL3 is energized to momentarily open an interrupter contact RL3-1 and advances each of a plurality of stepping relay switches RL3-2, RL3-3, RL3-4 and RL3-5 by one step from a home position contact A to a first position contact B. Relay stepping switch RL3-2, upon stepping to contact B, completes a circuit from ground reference potential $V_g$ to a push-to-talk or keying input 70 of base station transmitter 42 which turns on in response thereto. Relay stepping switch RL3-3, upon stepping to contact B, completes a circuit from a fourth voltage source $V_{s4}$ to ground reference potential $V_g$ through parallel lamps 72 and 74 which light to provide an indication at the base station that a communication link between a telephone and a remote station has been established. Stepping relay switch RL3-4, upon stepping to contact B, connects telephone line 50 with one side of an input transformer coil 76, and stepping relay switch RL3-5, upon stepping to contact B, connects telephone line 52 to the other side of primary input transformer coil 76 through a monitor primary transformer coil 70′.

When input transformer coil 76 is coupled across telephone lines 50 and 52 an impedance change is detected by telephone switching system 12 which terminates the ring signal in response thereto. It should be noted, that although the call connection is completed upon reception of the first ring signal, the circuit of FIG. 2 could be altered by changing the connections of input transformer coil 76, indicator lamps 74 and 72, push-to-talk input 70 and latching contact RL3-1, from the first step contacts B to second, third, or fourth step contacts such that the call connection would not be completed until the second, third or fourth ring signals. This might be desirable to give an operator at the base station an opportunity to answer the call locally before the call is automatically connected with remote stations 10.

Base station transmitter 42 begins to transmit a carrier signal to the remote station in response to its push-to-talk input 70 being grounded through stepping relay switch RL3-2. At the remote station, a bell or other indicating device is energized upon reception of the transmitted signals to alert an operator thereat of an incoming call. The operator may then pick up his handset and speak into its microphone to answer the call.

The voice signals from the remote station are transmitted back to the base station on a modulated carrier and received by base station receiver 43 which reproduces the voice signals on its output 58. The signals on output 58 are coupled through relay contact RL1-2 to transformer coil 60, induced in a transformer coil 60′, amplified by a preamplifier 78 and coupled through a balancing network comprising a potentiometer resistor 80 coupled across a receiving transformer coil 82. This signal is then induced in a reciving transformer coil 82′ and coupled to an input transformer coil 76′ through a transmission transformer coil 84. The voice signal in input transformer coil 76′ is induced in input transformer 76 and finally coupled to telephone wires 50 and 52 to be received and converted to sound at the calling telephone.

Audio signals from the calling telephone are coupled to transformer coil 76, induced in transformer coil 76′ and coupled to transformer coil 84 through transformer coil 82′. The signal in transformer coil 84 is induced in a transformer coil 84′ and applied to transmitter preamplifier 56 through a potentiometer resistor 88 and input resistor 90. The signal is amplified by transmitter preamplifier 56 and coupled to base station transmitter input 93 through a capacitor 92 for transmission to the remote station.

A feedback elimination network comprising transformer coils 82″, 84″, a variable resistor 86 and a capacitor 88, is provided to prevent transmission of received signals back to the telephone or remote station from which they originated. Signals from the remote station which are coupled through coil 84 are cancelled by a like signal of an opposite phase produced in coil 84″ to prevent induction thereof in transmission transformer coil 84′. Similarly, signals from telephone switching system 12 which are couled through coil 82′ are cancelled by a like signal of an opposite phase produced in coil 82″.

Two-way communication is maintained until either party terminates the call by returning his handset to an on-hook or cradle position. If the calling telephone is hung up, the telephone switching system automatically breaks the connection. If the telephone at the remote station is hung up, an initiate signal is automatically transmitted to the base station which disconnects the call in response thereto. The received initiate signal produced in transformer coil 60 is induced in a tone detector coil 60′ and coupled across inputs 96 and 98 of a suitable tone detector 44. Avalanche breakdown diodes 102 and 104 may be provided across inputs 96 and 98 to limit the magnitude of the signal thereacross to a safe level.

Tone detector 44 has two output circuits, a tone detector initiate output 44' and a tone detector dial output circuit 44''. Upon reception of the initiate signal, tone detector initiate output circuit 44' energizes a sixth relay RL6 to close its relay contact RL6-1 which energizes relay RL3 to advance all of the stepping switches to their respective C contacts, thereby terminating the call connection.

The relay stepping switches are returned to their respective home positions by operation of interrupter relay switch RL3-1. Upon termination of the initiate signal, RL6-1 is opened to break the ground path connection to deenergize relay RL3. However, when relay RL3 is deenergized, interrupter contact RL3-1 closes to provide an alternate ground path connection through contact C of relay stepping switch RL3-1, and relay RL3 is again energized to advance all of the relay stepping switches one more step. All of the remaining contacts of relay stepping switch RL3-1 are also connected to ground, and thus, the stepping relay RL3 is repetitively energized and deenergized until all of the stepping relay switches have stepped around to their respective A contacts or home positions. A manual reset switch is provided to energize stepping relay RL3 to enable a local operator to place or terminate remote calls.

B. Automatic Base Station Operation During Call From Remote Station

As previously stated, provision is made to enable an operator at a remote station to directly place a call to a preselected telephone of telephone switching system 12 by dialing the appropriate number. When an operator at the remote station lifts the handset to place a call, a tone initiate signal is automatically transmitted to the base station receiver where it is detected by tone detector 44 which energizes relay RL6. When relay contact RL6 is energized, relay contact RL6-1 switches to its energized position to complete a circuit from relay RL3 to ground reference potential $V_g$. This energizes relay RL3 which advances its stepping switches to their respective B contacts in the identical manner as when a ground path is completed through relay contact RL4-1 in response to a ring signal from an incoming call.

Once the relay stepping switches RL3-4 and RL3-5 are advanced to their respective B contacts, the base station is connected with the telephone switching system 12 which generates a dial tone on telephone lines 50 and 52 in response thereto. This dial tone is transmitted by base station 14 to the calling remote station 10 to provide an indication to the operator thereat that he may commence dialing. The operator may then dial the number of the telephone which he intends to call. The remote station automatically generates dial signal pulses corresponding to the number dialed. For example, if the number 2 is dialed, the remote station generates two dial pulses at a frequency different from the frequency of the initiate signal. These dial pulses are detected by tone detector dial output circuit 44'' which generates a corresponding pulse output to periodically deenergize a normally energized relay RL5. Relay RL5' is maintained in a continuous energization state, and when dial output circuit 44'' deenergizes relay RL5, it causes a relay contact RL5-1 to temporarily switch input transformer coil 76 out of circuit with the telephone lines 50 and 52 which simulates local dial signal generation. When the called party answers the telephone, the call connection is completed, and communication proceeds in the manner already described.

C. Local Base Station Operation

With mode selection switch 54 in the local or closed position, relays RL1 and RL2 are energized to condition the base station for local operation. Relay contact RL2-1 switches to its energized position to remove power from indicator lamps 62 and 64 and to apply it to local operation indicator lamps 102 and 104. Relay contact RL2-2 switches to its energized position to remove monitor transformer coil 70 from input 66 and to apply a transformer coil 106 to input 66. Relay contact RL1-1 switches to its energized position to remove power from transmitter preamplifier 56 and apply it to a preamplifier 108. Relay contact RL1-3 switches to its energized position to remove supply voltage $V_{s1}$ from relay RL3 and apply it to a seventh relay RL7. Finally, relay contact RL1-2 assumes its energized position to remove the output of base station receiver 43 from transformer coil 60 and apply it to a relay contact RL7-3 of relay coil RL7 to be coupled to a transformer coil 109. Two other transformer coils 110 and 112 inductively coupled with transformer coils 109 and 106 are, in turn, coupled across a telephone handset 111 when a switch 114 is in a closed position.

With switch 114 in a closed position, an operator at the base station may communicate with an operator at the remote station by closing a push-to-talk switch 116 to energize relay RL7. Relay RL7 upon being energized, switches relay contacts RL7-1, RL712, RL7-3 and RL7-4 to their respective energized positions to enable transmission from the base station to the remote station. RL7-1, in its energized position, couples supply voltage $V_{s4}$ to a plurality of parallel indicator lamps 118 which light to provide an indication that the base station is in a transmit mode. RL7-3, in its energized position, couples the signals induced in transformer coil 109 from handset 111 to the input 120 of preamplifier 108. Relay contact RL7-2, in turn, couples the amplified audio signals from preamplifier 108 to input 93 of base station transmitter 42 for transmission to the remote station and relay contact RL7-4 couples ground potential to push-to-talk input 70 to key on base station transmitter 42.

In a standby position or when the operator of the base station wishes to receive a response from an operator at the remote station, push-to-talk switch 116 is allowed to return to its normally open position to deenergize relay RL7. With relay RL7 deenergized, its relay contacts condition the base station to receive signals from the remote station. Relay switch RL7-1 in its unenergized position, as shown in FIG. 2, uncouples supply voltage $V_{s4}$ from indicator lamp 118 to remove the indication of local transmission. Relay contact RL7-3 in its unenergized position couples output 58 at the base station receiver 43 to transformer coil 109. The audio signals produced in transformer coil 109 induce corresponding signals in transformer coil 110 which are converted to sound by the speaker of handset 111. Relay contact RL7-4 in its unenergized state uncouples the ground potential from push-to-talk switch 70 to disable base station transmitter 42, while relay contact RL7-2 removes the output of preamplifier 108 from input 93 of base station transmitter 42.

A standard telephone dial circuit 110 is coupled across handset 111 and connectable with telephone lines 50 and 52 through single-pole, double-throw switch 112, to enable an operator at the base station to place calls through the telephone switching system or to monitor communication on telephone lines 50 and 52. A telephone bell 112 is also provided to give an indication of incoming calls to the base station.

III. Remote Station Operation

Figure 3:
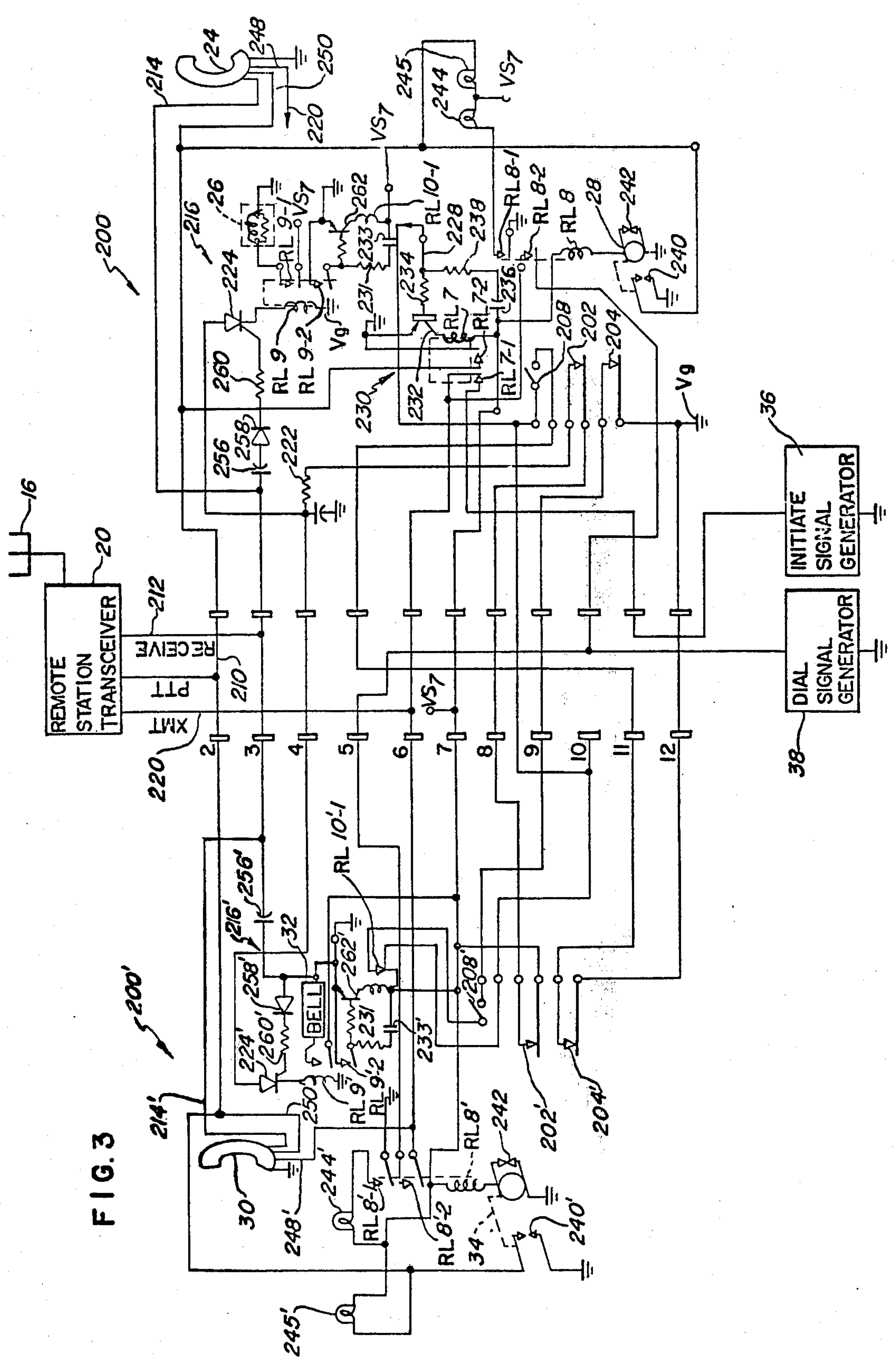
FIG. 3 is a schematic diagram of a preferred embodiment of the remote station with the transceiver and tone detector of FIG. 1 shown in block form.

Turning now to FIG. 3, a circuit schematic diagram of the embodimnt of the remote station of FIG. 1 and usable in conjunction with the base station of FIG. 2 is shown. As previously stated, remote station 10, through operation of base station 14, has provision for both receiving a call from, and for placing a call to, a telephone of telephone switching system 12 by dialing the appropriate telephone number. In the embodiment shown in FIG. 3, two substantially identical circuits, a master circuit 200 and a slave circuit 200', are provided. Either of these circuits may be alternately utilized to both place and receive calls through the base station. Since these circuits operate in a substantially similar manner, circuit elements of slave circuit 200' which correspond to elements of master circuit 200 will be given the same reference numeral followed by a prime, and descriptions of the operation of an element of one circuit may generally be considered as being descriptive of the operation of the corresponding element in the other circuit.

Master station 200 includes a master telephone handset 24, a master telephone bell 26, and a master telephone dial 28. Slave circuit 200' includes a slave handset 30, a slave telephone bell 32, and a slave telephone dial 34. Both of these circuits are connectable with dial signal generator circuit 38 and initiate signal generator 36 which may comprise any two suitable oscillators for respectively generating tone signals at different frequencies. Similarly, the handsets of both circuits are connectable with a suitable remote station transceiver 20 for transmission and reception of audio signals therethrough.

A. Initial Conditions of the Remote Station Prior to Placing or Answering a Call Before placing or answering an incoming call, both handsets 24 and 30 are in their cradle positions, and the remote station is thereby in a standby condition with hanger switches 202 and 204 of master handset 24 and corresponding hanger switches 202' and 204' of the slave handset 30 in their respective closed or on-hook positions. Also, momentary contact switches 208 and 208' are in their normally open position. Further, when remote station 10 is in the standby condition, the voltage on a push-to-talk or keying input 210 of remote transceiver 20 is floating to keep transceiver 20 in a receive mode. In the receive mode, transceiver 20 functions as a radio receiver to reproduce the audio signals transmitted thereto by base station 14 on its receive output 212. Receive output 212 is coupled to speaker inputs 214 and 214' of handsets 24 and 30 respectively and to inputs of incoming call detector circuits generally designated by reference numberals 216 and 216'. A supply voltage $V_{s7}$ is coupled through hanger switches 202 and 202' to incoming call detector circuits 216 and 216' which are enabled thereby to actuate telephone bells 26 and 32 in response to an incoming call.

B. Placing a Call From the Remote Station

When either handset is lifted from its cradle position to place a call, the incoming call detector circuits 216 and 216' are disabled, the remote station transceiver 20 is keyed into its transmit mode for a preselected time period and the output of initiate signal generator 36 is coupled to a transmit input 220 of transceiver 20 for a preselected time period for radio transmission to the base station, which, as previously explained, makes connection with the telephone switching system 12. The incoming call detector circuits 216 and 216' are disabled by the opening of either hanger switch 202 or hanger switch 202'. When both switches 202 and 202' are in their closed position, supply voltage $V_{s7}$ is coupled therethrough and through series resistor 222 to the anode inputs of SCR's 224 of incoming call detector 216 and SCR 224' of incoming call detector 216'. When either or both switches 202 and 202' are open, this circuit is broken and the incoming call detector circuits 216 and 216' are disabled. The momentary contact switches of either handset, upon closing, couple a ground reference potential $V_g$ to an input 228 of an initiate signal control circuit, generally designated by reference numeral 230, which keys on transceiver 20 for transmission and couples initiate signal generator 36 to transmit input 220. The ground potential for momentary contact switch 208 is taken through hanger switch 204'of slave handset 30 and the ground reference potential for momentary contact switch 208 is taken through hanger switch 204 of master handset 24 to prevent generation of a second initiate signal after the call has been answered in response to the nonanswering handset being removed from its cradle to place a call or to monitor communication with the other handset.

The initiate control circuit 230 comprises a PNP transistor 232 having an emitter directly coupled to ground and a collector coupled to supply voltage $V_{s7}$ through a relay coil RL7. The base of transistor 232 has its base coupled to input 228 through a base input resistor 234 and turns on to energize relay RL7 in response to a ground potential being coupled thereto. An RC time delay circuit comprising a capacitor 236 and a resistor 238 coupled between supply voltage $V_{s7}$ and input 228 is provided to keep relay RL7 energized for a preselected time period of sufficient length to enable the base station to make connection with telephone switching system 12. Two normally open relay contacts RL7-1 and RL7-2 are provided to respectively couple the output of initiate signal generator 36 to transmitter input 220 and to key on transceiver 20 to transmit the initiate signal to the base station during the preselected time period of energization of relay RL7.

The momentary switch contacts couple ground potential to input 228 for only a short period of time, and thus, at the end of the preselected time delay period, transistor 234 turns off to deenergize relay RL7. When relay RL7 is deenergized, relay contact RL7-1 returns to its open position to remove the output of initiate signal generator 36 from transmitter input 220, and relay contact RL7-2 returns to its open position to remove ground potential from keying input 210 of remote station transceiver 20 to return it to its receive mode. When the base station has made a connection with telephone switching system 12 during the initiate signal 12, telephone switching system 12 will develop a dial tone which will be transmitted back to remote station 10 to indicate to the remote station operator that he may dial the desired telephone number.

Master telephone dial 28 and slave telephone dial 34 are respectively provided with normally open keying contacts 240 and 240' and normally closed dial pulse contact 242 and 242'. Keying contacts 240 and 240' close each time the associated dial actuator is rotated off of its home position to couple ground reference potential $V_g$ to push-to-talk input 210 which keys transceiver 220 into its transmit mode so that the dial signals may be transmitted thereby. Pulse contacts 242 and 242' in their normally closed positions complete a circuit from supply voltage $V_{s7}$ to ground through relay coils RL8 and RL8', respectively.

Relay contacts RL8-1 and RL8'-1 respectively associated with relays RL8 and RL8' are provided to generate a visual dial pulse indication. Relay contact RL8-1 is normally in a closed or energized position to complete a circuit path from supply voltage $V_{s7}$ to ground through a dial indicator lamp 244 which is, thus, normally in an on or lit condition. However, when the dial actuator is released, normally closed dial pulse contact 242 periodically opens and closes a number of times (corresponding to the dial position from which the actuator was released) during the return of the actuator to its home position. Each time contact 242 opens and closes, relay RL8 is deenergized and energized to open and close relay contact RL8-1 which causes lamp 244 to flash off and on. An indicator lamp 244' is connected with relay contact RL8'-1 and operates in a similar manner. Relay contact RL8-2 and RL8'-2 respectively associated with relays RL8 and RL8' open and close in the same fashion as relay contacts RL8-1 and RL8'-1 to peroidically couple the output of dial signal generator 38 to transmitter input 220 and to uncouple it from transmitter input 220 of transceiver 20 each time dial pulse contacts 242 open and close when a number is dialed. Indicator lamps 245 and 245' coupled from supply voltage $V_{s7}$ to ground are provided to give an indication of whether the transceiver is in a transmit or receive mode.

As previously explained, the pulse dial signal is transmitted to the base station which generates a corresponding dial signal across the telephone lines 50 and 52. After telephone switching system 12 connects the base station with the desired telephone, a busy signal or ring indicator signal produced by switching system 12 is transmitted back to the remote station where it will be reproduced in the speaker of handset 24 or handset 30, as would any other transmission from the base station. To respond to the called party at the telephone of telephone switching system 12, the operator at the remote station must ground push-to-talk input 210 and speak into a handset microphone (not shown) associated with either handset. The output signals from both microphone output 248 of handset 24 and microphone output 248' of handset 30 are directly coupled to transmitter input 220 of transceiver 20 to be transmitted thereby back to base station 14 and the called party. Outputs 250 and 250' of push-to-talk switches (not shown) at handsets 24 and 30, respectively, may be provided to enable an operator to manually ground push-to-talk input 220 to key on the transceiver 20 into its transmit mode.

Termination of a call is achieved at the remote station by returning both handsets to their respective cradle positions. When a handset is returned to its cradle position, the output of initiate signal generator 36 is automatically coupled to transmitter input 220 of transceiver 20 which is temporarily keyed on to transmit the initiate signal to the base station which, as previously explained, disconnects from telephone switching system 12. For example, when handset 24 is returned to its cradle position, momentary contact switch 208 closes temporarily to couple ground reference potential $V_g$ to input 228 of initiate control circuit 230 which couples the output of initiate signal generator 36 to transmit input 220 through relay contact RL7-1 and couples ground reference potential to push-to-talk input 210 through relay contact RL7-2 for a preselected time period. The initiate signal is generated in a similar manner when handset 30 is returned to its cradle, with momentary contact switch 208 closing to activate the initiate signal control circuit 230. It should be noted that the ground reference potential at one side of switch 208 is taken through switch 204' and ground reference potential for switch 208' is taken through switch 204 such that the initiate signal will not be generated unless both handsets are returned to their respective cradle positions.

C. Receiving a Call at the Remote Station

As previously discussed, when the base station 14 receives an incoming call from a telephone of telephone switching system 12, it automatically makes the connections necessary to answer the call and keys on the transmitter to transmit signals from the calling telephone to remote station 10. The transceiver 20 at the remote station is normally in a receive mode and picks up the transmitted signal on its antenna 16 and couples it to the inputs of incoming call detector circuits 216 and 216' on receive output 212. The incoming call detector circuits, in response to the received signal, energize telephone bells 26 and 32 and disable initiate signal control circuit 230 so that an initiate signal will not be transmitted when either of the handsets are lifted from their cradle positions to answer the call.

The incoming call detector circuits 216 and 216', respectively, comprise SCR's 224 and 224' coupled from supply voltage $V_{s7}$ to ground through relays RL9 and RL9'. when a carrier signal is recived, the receiver is unsquelched and a signal appears on receive output 212 and is coupled through capacitor 256, diode 258 and resistor 260 to the gate input of SCR 224 which turns on in response thereto to energize relay RL9. The signal is also coupled through capacitor 256', diode 258' and resistor 260' to the gate input of SCR 224' which turns on in response thereto to energize relay RL9'. Relay contacts RL9-1 and RL9'-1 switch to closed or energized positions to energize telephone bells 26 and 32, respectively, and relay contacts RL9-2 and RL9'-2 switch to closed positions to turn on PNP transistors 262 and 262', respectively. When transistor 262 turns on, it energizes a relay RL10 and when transistor 262' turns on, it energizes a relay RL10'-1. A relay contact RL10-1 of relay RL10 switches to an open position in response to relay RL10 being energized and a relay contact RL10'-1 switches to its open position in response to relay RL10' being energized. With either of relay contacts RL10-1 or RL10'-1 in an open position, input 228 of initiate signal control circuit is uncoupled from its sources of ground reference potential and, thus, is disabled from generating the initiate signal.

When either handset is lifted from its cradle position to answer the incoming call, power is removed from the incoming call detector circuit 216 and 216' which deenergizes telephone bells 26 and 32 and removes base drive from transistors 262 and 262'. After a preselected time period determined by the RC time constants of resistor 231 and capacitor 233 of transistor 262 and resistor 231' and capacitor 233' of transistor 262', transistor 262 and 262' turn off to respectively deenergize relays RL10 and RL10', to enable the initiate signal control circuit 230 so that the initiate signal may be generated upon termination of the call. Once a handset is lifted from the cradle position, the direction of communication is controlled at the remote station by controlling a push-to-talk switch (not shown) to couple and uncouple ground reference potential to push-to-talk input 210 of transceiver 20. The call may be terminated in the manner described above.

IV Hand-Held Remote Station

Figures 4, 5:
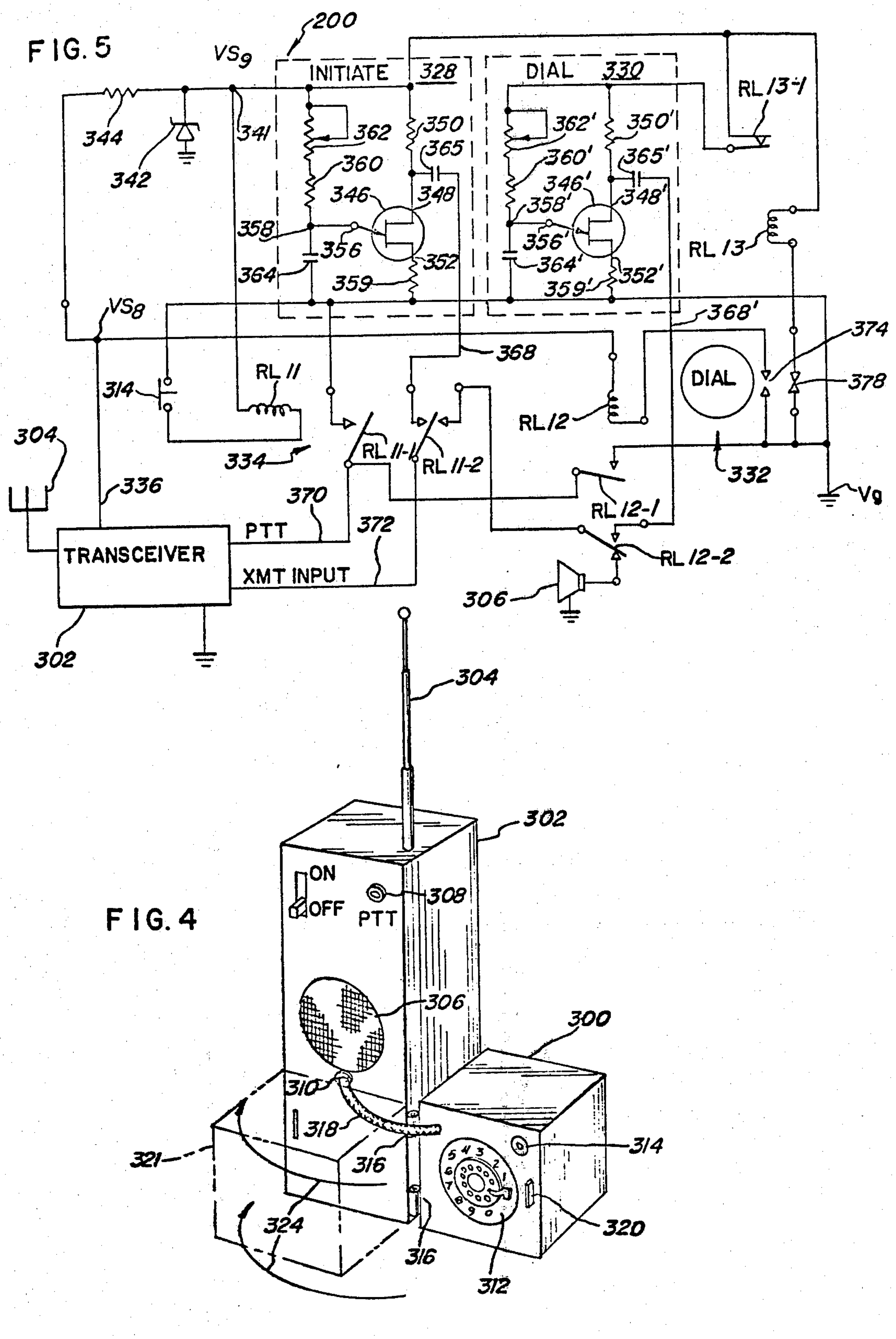
FIG. 4 is a perspective drawing showing a housing for a remote station dialing unit connected with a suitable hand held, shortwave radio transceiver to adapt it for use as a remote station in the system of FIG. 1.
FIG. 5 is a schematic circuit diagram of a preferred embodiment of the remote station dialing unit of FIG. 4.

Referring to FIG. 4, a remote station dialing unit 300 is shown connected with a standard hand-held radio transceiver 302 for adaption thereof for use as a remote station in the remote telephone communication system of FIG. 1. The transceiver 302 may be of any type having an antenna 304, a speaker microphone 306 and capable of operating as a transmitter when its push-to-talk button 308 is actuated and operating as a receiver when the push-to-talk button 308 is released. The radio transceiver 302 may also be provided with a cable connector 310 for connection with a push-to-talk or keying input, a transmit input and a receive output. The remote station dial unit 300 is provided with a telephone dial 312 and initiate switch 314 and is mounted on transceiver 302 by means of a pair of hinges 316. A cable 318 is also provided for connection with transceiver 302, and a latch 320 may be provided to secure dialing unit 300 to transceiver 302 in the position indicated by the box 321 shown in dashed lines when the dialing unit 300 is pivoted into that position as indicated by curved arrows 324.

Referring to FIG. 5, a schematic circuit diagram of a preferred embodiment of the remote station dialing unit 300 is shown connected with a suitable transceiver 302 to provide it with direct dialing capabilities. The remote station dialing unit 300 essentially comprises an initiate signal generator 328, a dial signal generator 330, a dial circuit 332 and an initiate signal control circuit 334. The power for the dialing unit 300 may be provided by transceiver 302 on a power supply output lead 336 which may be a part of cable 318, or remote dialing unit 300 may have its own power supply. In either event, a positive supply voltage $V_{s8}$ is provided at junction 341. A second DC supply voltage $V_{s9}$, less than supply voltage $V_{s8}$, is developed by an avalanche diode 342 coupled from junction 341 to ground which, in turn, is coupled to supply voltage $V_{s8}$ through a current limiting resistor 344.

Initiate signal generator 328 and dial signal generator 330 are substantially identical and comprise oscillators operating at different frequencies. The initiate signal generator 328 is free running and comprises a unijunction transistor 346 having a first base 348 directly coupled to supply voltage $V_{s9}$ through a load resistor 350, a second base 352 coupled to ground reference potential $V_g$ through a resistor 354, and a gate 356 coupled to a junction 358 which, in turn, is coupled to supply voltage $V_{s9}$ through a limiting resistor 360 and a frequency setting variable resistor 362 and coupled to ground reference potential $V_g$ through a capacitor 364.

Since the two oscillator circuits are substantially identical, the elements of the dial signal generator 30, corresponding to elements of the initiate signal generator 328 have been given the same reference number followed by a prime. The only difference, between the oscillator circuits, aside from operating at different frequencies, is that the initiate signal generator 322 is directly coupled to supply voltage $V_{s9}$, and is thus, free running, whereas the dial signal generator is coupled to supply votage $v_{s9}$ through a relay contact RL13-1 and, thus, only oscillates when this contact is intermittently closed during the dialing operation. Thus, the following description of the operation of the initiate signal generator 328 may be taken as descriptive of the operation of the dial signal generator when the relay contact RL13-1 is closed. When power is first applied to the remote station dialing unit 300, capacitor 364 is charged toward supply voltage $V_{s9}$ through variable resistor 362 and resistor 360. The charging time of capacitor 364 is determined by the RC time constant of this circuit which is set by variable resistor 362. When capacitor 364 reaches a preselected value, unijunction transistor 346 turns on to discharge an output capacitor 365 toward ground reference potential $V_g$. Upon transistor 346 turning on, capacitor 364 discharges into gate 356, and when the voltage across capacitor 364 decreses to a second preselected value, transistor 346 turns off and a positive pulse is coupled through capacitor 364 and developed on initiate signal generator output 368. Capacitor 364 is again charged through variable resistor 362 and limiting resistor 360 until transistor 346 again turns on to repeat the process. As stated, dial signal generator circuit 330 operates in an identical manner and generates an oscillating output on its output 368' but at a different frequency than that of the output signal of initiate signal generator 328 as set by variable resistor 362'.

The initiate signal on output 368 is coupled to transceiver 302 and transmitted thereby when the normally open initiate switch 314 is manually closed. When switch 314 is closed, a circuit is completed between supply voltage $V_{s9}$ and ground through a relay RL11 which is energized thereby. When relay RL11 is energized, a relay contact RL11-1 switches to a closed position to couple ground reference potential $V_g$ to a push-to-talk input 370 of transceiver 302 which switches to its transmit mode in response thereto. Simultaneously, a relay contact RL11-2 switches from its unenergized position, as shown in FIG. 5, to its energized position to uncouple the transmitter input 372 from speaker/microphone 306 and to connect it with the output 368 of initiate signal generator 328. When initiate switch 314 is released and returns to its open state, relay RL11 is deenergized and transceiver 302 returns to its normal receive mode.

If the base station telephone line connection is made in response to the initiate signal, a dial tone will be transmitted to the transceiver 302 and the operator may then dial the desired telephone number. Each time dial 332 is actuated, a dial contact switch 374 closes to complete a circuit from supply voltage $V_{s8}$ to ground through a relay RL12 which is energized thereby.

When relay RL12 is energized, the relay contact RL12-1 closes to couple ground reference potential to push-to-talk input 370 to switch transceiver 302 into its transmit mode, and a relay contact RL12-2 switches to its energized position to couple transmitter input 372 to output 368' of dial signal generator 330 and to uncouple it from speaker/microphone 306.

As the dial actuator, upon being released, returns to its home position, pulse dial contacts 378 periodically open and close a number of times corresponding to the number dialed. Each time contacts 378 close, a circuit is completed from supply voltage $V_{s9}$ to ground reference potential $V_g$ through a relay RL13, which is periodically energized and deenergized in response thereto. Each time relay RL13 is deenergized, a relay contact RL13-1 switches from its energized or open position to its unenergized or closed position. Each time switch RL13-1 closes, supply voltage $V_{s9}$ is coupled to dial signal generator 330, which generates a dial signal pulse on its output 368' in response thereto. The dial signal pulse is coupled to transmitter input 372 of transceiver 302 which transmits it to the base station.

After the proper call connection has been completed, the direction of communication is controlled at the remote station by actuation of push-to-talk switch 308. Calls may be received by transceiver 302 in the same manner as if the remote dialing unit 300 was not connected therewith.

I claim:

1. In a base station connectable with a telephone system for providing radio communication between a telephone of the telephone system and a remote station having means for transmitting an initiate signal, a circuit for controlling the connection between the telephone system and the base station, comprising:

means for receiving the initiate signal;

detection means for detecting reception of the initiate signal;

switch means having a first state in which communication may be established between a telephone and the remote station and a second state in which communication between a telephone and the remote station is broken;

means responsive to each detection of said initiate signal for switching said switch means to its second state, when in its first state, and switching said switch means to its first state, when in its second state; and means responsive to a ring signal generated by said telephone switching system for switching said switch means from its second state to its first state.

2. In a radio-telephone communication system having a base station connected with a telephone system for transmitting on a carrier wave audio information from a telephone of the telephone switching system to a remote station upon receiving an incoming call from said telephone, said base station initially transmitting an unmodulated carrier wave in response to an incoming call, a means at the remote station for providing an indication of an incoming call from said telephone, comprising:

an indicator;

means for developing a signal in response to reception of said unmodulated carrier wave; and means for activating said indicator to provide an indication of an incoming call in response to development of said signal.

3. A radio-telephone communication system, comprising:

a remote radio station having means for transmission of an initiate signal;

a base station connectable with a telephone switching system for establishing radio communication with a telephone of the telephone system and the remote station, said base station including a normally inoperative radio transmitter connectable with the telephone system, a receiver for receiving voice and initiate signals from the remote station, switch means having a first state in which the transmitter is rendered operative and connected with the telephone system to transmit voice signals from the telephone system to the remote station and a second state in which said transmitter is rendered inoperative and disconnected from the telephone system, means for detecting reception of said initiate signal, and means for detecting a ring signal from the telephone switching system;

switch control means including means responsive to each detection of said initiate signal to switch said switch means, when in its second state, to its first state and to switch said switch means when in its first state, to its second state, and means responsive to detection of said ring signal to switch said switch means, when in its second state, to its first state.

4. A radio-telephone communication system, comprising:

a remote radio station having means for transmission of an initiate signal;

a base station connectable with a telephone switching system for establishing radio communication with a telephone of the telephone system and the remote station, said base station including a normally inoperative radio transmitter connectable with the telephone system, a receiver for receiving voice and initiate signals from the remote station, switch means having a first state in which the transmitter is rendered operative and connected with the telephone system to transmit voice signals from the telephone system to the remote station, said radio transmitter, upon being rendered operative, transmitting a carrier signal to said remote station, and a second state in which said transmitter is rendered inoperative and disconnected from the telephone system, means for detecting reception of said initiate signal; and switch control means responsive to each detection of said initiate signal to switch said switch means, when in its second state, to its first state and to switch said switch means, when in its first state, to its second state, said remote station including means for detecting said carrier signal, and means responsive to detection of said carrier signal to disable said initiate signal transmission means from transmitting said initiate signal.

5. The radio-telephone communication system of claim 4 in which said disable means disables said initiate transmission means for a preselected time period.

6. A radio-telephone communication system, comprising:

a remote radio station having means for transmission of an initiate signal;

a base station connectable with a telephone switching system for establishing radio communication with a telephone of the telephone system and the remote station, said base station including a normally inoperative radio transmitter connectable with the telephone system, a receiver for receiving voice and initiate signals from the remote station, switch means having a first state in which the transmitter is rendered operative and connected with the telephone system to transmit voice signals from the telephone system to the remote station and a second state in which said transmitter is rendered inoperative and disconnected from the telephone system, means for detecting reception of said initiate signal; and switch control means responsive to each detection of said initiate signal to switch said switch means, when in its second state, to its first state and to switch said switch means, when in its first state, to its second state, said remote station including a master-extension circuit with a cradle switch which is activated both in placing and answering a call at the master-extension circuit, and a slave-extension circuit with a cradle switch which is activated both in placing and answering a call from the slave-extension circuit, means responsive to activation of either cradle switch for transmitting an initiate signal, means responsive to both placing and answering a call at either one of said extension circuits for disabling said initiate signal transmitting means from transmitting said initiate signal in response to activation of the cradle switch at the other extension circuit.

* * * * *